United States Patent [19]
Jadoul et al.

[11] Patent Number: 5,100,272
[45] Date of Patent: Mar. 31, 1992

[54] DEVICE PROVIDING DETACHABLE ASSEMBLY

[75] Inventors: Claude Jadoul, Fontenay Sous Bois; Eric Agostini, La Garenne Colombes, both of France

[73] Assignee: Alcatel Radiotelephone, Paris, France

[21] Appl. No.: 729,309

[22] Filed: Jul. 12, 1991

[30] Foreign Application Priority Data

Jul. 16, 1990 [FR] France .................................. 90 09047

[51] Int. Cl.⁵ .............................................. F16B 13/06
[52] U.S. Cl. ...................................... 411/45; 411/347; 24/617; 24/628; 24/653
[58] Field of Search ..................... 411/45, 57, 342, 347, 411/349, 552, 549, 550, 83, 354, 337, 338, 348, 553; 24/653, 628, 606, 617, 635

[56] References Cited

U.S. PATENT DOCUMENTS

| | | | |
|---|---|---|---|
| 1,091,449 | 3/1914 | Westin | 24/606 X |
| 1,647,773 | 11/1927 | Carr | 24/617 |
| 2,990,596 | 7/1961 | Oliveay | 24/617 |
| 3,019,501 | 2/1962 | Kraus et al. | 24/625 |
| 3,109,214 | 11/1963 | Clay | 411/349 |

FOREIGN PATENT DOCUMENTS

| | | | |
|---|---|---|---|
| 677438 | 6/1939 | Fed. Rep. of Germany | 24/617 |
| 460274 | 11/1913 | France | 24/606 |

*Primary Examiner*—Rodney M. Lindsey
*Attorney, Agent, or Firm*—Sughrue, Mion, Zinn, Macpeak & Seas

[57] ABSTRACT

A device for enabling a first part to be detachably assembled to a second part, the device comprising a first fastener and a second fastener fixed respectively to the first part and to the second part, assembly being obtained by engaging the fasteners along an "Engagement" axis, with engagement causing a retaining component of the first fastener to be inserted by deformation into a reception component of the second fastener, wherein:

the first fastener is fitted with return means tending to move it away from the second fastener;

the second fastener includes resilient means exerting pressure on the retaining component when inserted in the reception component to keep it therein, said resilient means being fitted with a return device to move them away from the retaining component during detachment; and the retaining component and the reception component are complementary in shape.

7 Claims, 2 Drawing Sheets

DEVICE PROVIDING DETACHABLE ASSEMBLY

The present invention relates to a device providing detachable assembly of one part to another by means of fasteners fixed to said parts. It is particularly appropriate to cases when it is desired to provide assembly that is quick, reversible, and above all accurate and without play.

BACKGROUND OF THE INVENTION

Detachable assembly devices are numerous and very varied in the types of connection they provide. When it is desirable for assembly and disassembly to take place quickly, certain types of connection must necessarily be eliminated: e.g. screw and nut connections. It is often preferable to use connections obtained by interfitting fasteners, with assembly causing a latching element on one of the fasteners to be inserted by deformation into a receptacle fixed to the other fastener. This applies, for example, to certain couplings between suction tubes where a connection is obtained by inserting a retractable stud fixed to the end of one tube in a receiving hole formed in the end of another tube. These couplings do indeed enable assembly and disassembly to be performed quickly. Their defects lie in lack of positioning accuracy and in residual play. Although such defects can be accepted in couplings between suction tubes, they may be quite unacceptable in other apparatuses.

In some apparatuses, it is very desirable for certain component parts to be capable of being assembled by a detachable assembly system quickly and without play in such a manner as to lead to the components being genuinely locked together. This applies, for example, when installing a storage battery in a portable radiotelephone. A storage battery represents a significant portion of the weight of such a radiotelephone. Since the radiotelephone is portable, it will be subjected to numerous movements, which movements may be repetitive. If the battery is not properly held in its support this gives rise to nuisance for the user (e.g. because of the noise of the battery banging about) and for the apparatus (damage due to repeated shocks, and possibly an interruption of the power supply). Nevertheless, it must be possible for a battery to be installed and to be removed quickly, and this excludes using a screw and nut type connection.

The present invention seeks to solve this type of problem. It consists in using a deformable component (or a plurality of deformable components such as tongues) having a well-defined profile and suitable for engagement in a receptacle. After being deformed, the deformable component is accurately placed in a suitable housing. Any subsequent displacement of the component is prevented by the presence of a sliding part which holds it in place by applying pressure so as to eliminate any residual play. For the user, this gives rise to a single action for locking purposes and to a simple action for unlocking.

SUMMARY OF THE INVENTION

The present invention therefore provides a device for enabling a first part to be detachably assembled to a second part, the device comprising a first fastener and a second fastener fixed respectively to the first part and to the second part, assembly being obtained by engaging the fasteners along an "engagement" axis, with engagement causing a retaining component of the first fastener to be inserted by deformation into a reception component of the second fastener, wherein:

the first fastener is fitted with return means tending to move it away from the second fastener;

the second fastener includes resilient means exerting pressure on the retaining component when inserted in the reception component to keep it therein, said resilient means being fitted with a return device to move them away from the retaining component during detachment; and the retaining component and the reception component are complementary in shape.

BRIEF DESCRIPTION OF THE DRAWINGS

An embodiment of the invention is described by way of example with reference to the accompanying drawings, in which.

DETAILED DESCRIPTION

Figure 1:
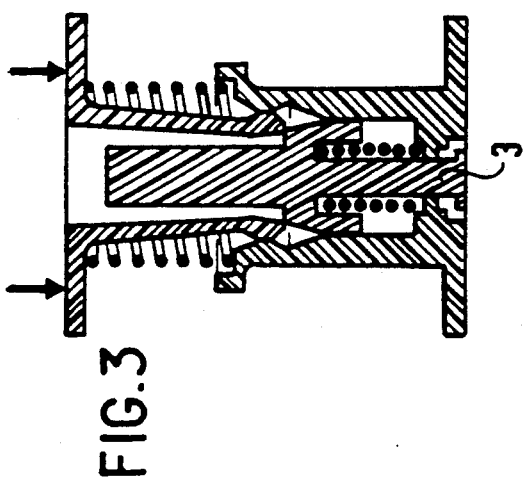
FIGS. 1 to 3 are section views showing a device of the invention while it is being locked.
Figure 2:
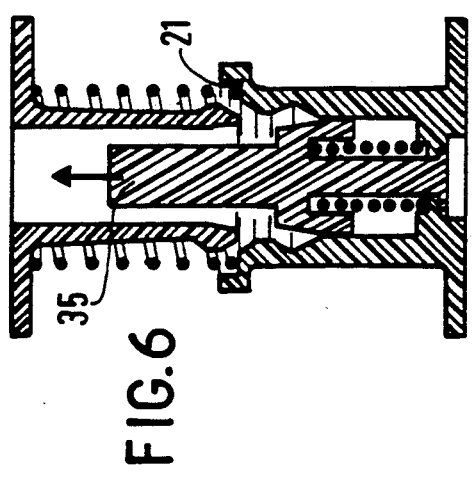
Figure 3:
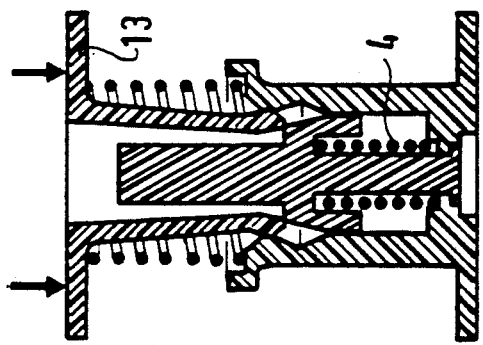
Figure 4:
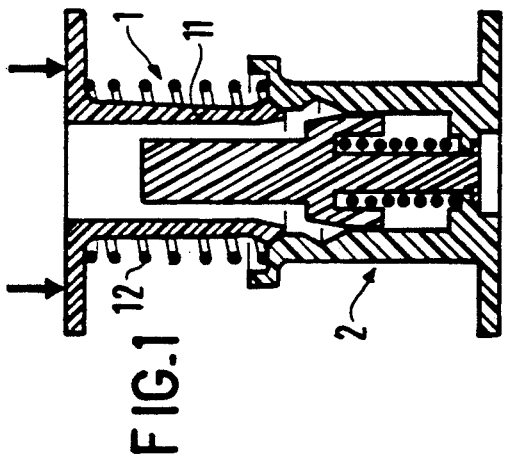
FIG. 4 is a section view showing the same device in its locked position.
Figure 5:
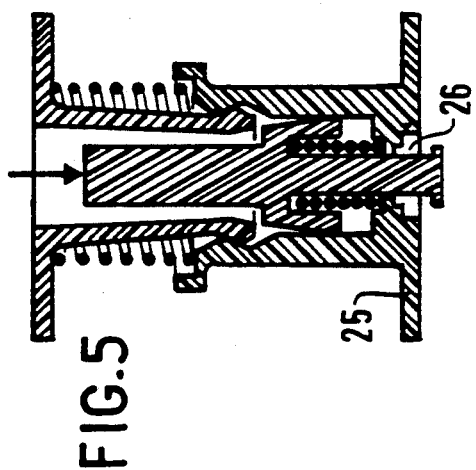
FIGS. 5 and 6 are section views showing the device while it is being unlocked.
Figure 6:
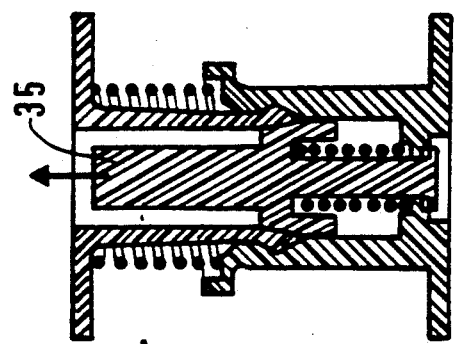

According to the invention, the parts to be connected are assembled together by means of fasteners, with each part possessing its own fastener. These fasteners, which are complementary, are securely fixed to the parts, e.g. by a screw and nut connection, by welding, or by gluing. They may also be integral portions of the parts.

Various shapes of retaining component and of reception component may be provided, but they must be complementary. The essential point is that when the retaining component is in its locked position in the reception component, the resilient pressure means acting on the retaining component make any relative movement of one component relative to the other impossible. The pressure may be exerted directly or indirectly. The resilient means advantageously include a spring.

The return means tending to separate the fasteners from each other may be constituted by one or more springs or by any other means known to the person skilled in the art.

The fasteners may be of various different shapes. Such adaptability constitutes an additional advantage. However, a tubular shape comprising a plurality of retaining components makes them particularly effective since it is then possible to distribute symmetrically the pressures exerted on the retaining components.

FIGS. 1 to 6 show fasteners of the invention having this advantageous tubular shape, with the tubular portion being axially split to delimit a plurality of tongues, e.g. four tongues.

For a portable radiotelephone, the fastener including the tongues may be fixed to the battery, with the other fastener then being fixed to the body of the radiotelephone.

FIGS. 1 to 6 show a detachable assembly device of the invention in various different locking and unlocking positions. The device comprises a first fastener 1 fixed to a first part (not shown) and a second fastener 2 fixed to a second part (also not shown). These fasteners are generally tubular in shape. They are shown in axial section. The axially split fastener 1 comprises four tongues, for example, such as the two tongues 11. A cylindrical spring 12 is situated around the tubular portion of the fastener 1. One end of the stroke of the spring is limited by a base 13 of the fastener 1 and the spring may be fixed thereto to prevent it escaping from its position when the fasteners 1 and 2 are separated. During locking, the other end of the spring 12 bears against a shoulder 21 (see FIG. 7) at the inlet face of the fastener 2. The spring thus exerts a force which tends to separate the fasteners from each other.

Figure 7:
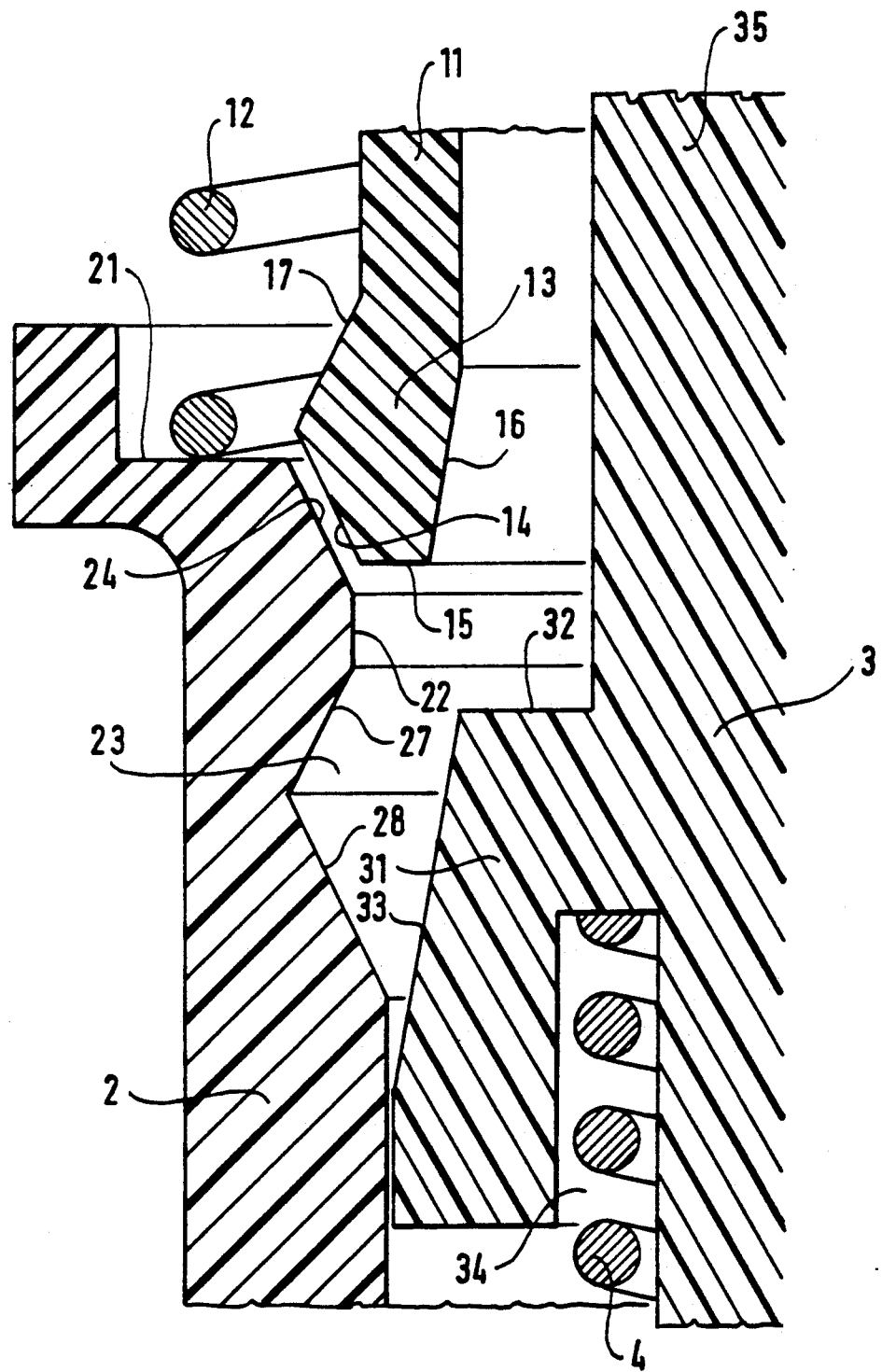
FIG. 7 is a section view showing a detail of the device of the invention.

The tongues include retaining components 13 that are complementary in shape to reception components 23 formed in the fastener 2 (FIG. 7).

As shown in FIG. 1, assembly is performed by interfitting the tubular portions of the fasteners via their inlet faces. These inlet faces are chamfered to the same angle relative to the interfitting axis. The chamfered faces constitute mutual sliding surfaces that cause one or both of the fasteners to be deformed on engagement. In the example shown in FIGS. 1 to 7, the inlet face of fastener 1 tapers on the outside to constitute a sliding face 14. The inlet face of fastener 2 is flared on the inside to constitute another sliding face 24.

The retaining component 13 is in the form of a triangular section rim formed on each tongue, with one of the sides of this triangular section being constituted by the sliding face 14. The reception component 23 is constituted by a triangular section groove formed in the internal periphery of the fastener 2. A transition surface 22 may be found between sliding face 24 and the reception component or groove 23.

Inside the fastener 2 there is a cylindrical sliding component or plug 3 including a shoulder 31 on which there are formed a thrust face 32 and a pressure face 33. The thrust face 32 of the plug 3 corresponds to a thrust face 15 of the fastener 1, said thrust face 15 being advantageously situated at the ends of the tongues 11. The pressure face 33 corresponds to faces 16 of the first fastener formed by flaring out its inside.

Opposite to the thrust face 32, a recess 34 is formed in the shoulder 31. The recess is annular in shape about the same axis as the plug 3. It serves to receive the end of a cylindrical spring 4.

Adjacent to the fastener 1, the sliding component 3 is extended by a rod 35 whose function is described below.

The bottom 25 of the fastener 2 is pierced by a hole 26 through which one end of the plug 3 passes. The hole 26 is formed in such a manner as to enable the end of the plug to slide therethrough while ensuring that the spring 4 is retained inside the fastener 2.

The fasteners 1 and 2 and the plug 3 may be made of plastic.

The device is locked as follows. When the tongues are presented on the axis of the receptacle and progressive pressure is exerted as indicated in FIG. 1, the tongues are deformed inwards by the faces 14 sliding over the face 24. The thrust faces 15 come into contact with the thrust face 32 of the plug so that the spring 4 opposes insertion of the fastener 1. Downwards movement of the tongues is accompanied by downwards movement of the plug with the spring 4 being compressed.

After a transition specified by the surface 22, the surface 27 of the reception component 23 enables the tongues to return to their rest state, thereby releasing the plug 3 which rises under drive from the spring 4 until there is no clearance between the pressure face 33 and the face 16, between the face 17 (constituting a second edge of the triangular profile of the retaining component 13) and the surface 27, or between the sliding face 14 and the surface 28 of the reception component 23. The tongues are thus very accurately put into place and they are held without any play. The spring 12 which is compressed as soon as the tongues begin to move downwards, thus remains compressed so long as the assembly is locked together.

To unlock the device, it suffices merely to apply sufficient pressure on the top of the rod 35 to compress the spring 4. The plug thus releases the pressure it was applying to the tongues. Under the effect of pressure from the spring 12 and the faces 17 and 27, the tongues deform again, thereby enabling fastener 1 to move upwards. The user can then release the pressure exerted on the rod 35 and thus allow the plug to move up in turn. The device is thus unlocked.

Other configurations of this detachable assembly device may be given without going beyond the scope of the invention. Thus, the tongues of the first fastener could engage around the outside of the second fastener.

The plug return means could be situated at the opposite end to the rod described above, in which case unlocking would be achieved by pulling the plug.

I claims:

1. A device for enabling a first part to be detachably assembled to a second part, the device comprising a first fastener and a second fastener fixed respectively to the first part and to the second part, assembly being obtained by engaging the fasteners along an "engagement" axis, with engagement causing a retaining component of the first fastener to be inserted by deformation into a reception component of the second fastener, wherein:

the first fastener is fitted with return means tending to move it away from the second fastener;

the second fastener includes resilient means exerting pressure on the retaining component when inserted in the reception component to keep it therein, said resilient means being fitted with a return device to move them away from the retaining component during detachment; and the retaining component and the reception component are complementary in shape.

2. A device according to claim 1, wherein each fastener comprises a tubular portion terminated by an inlet face, assembly being achieved by interfitting the tubular portions via their inlet faces.

3. A device according to claim 2, wherein the inlet faces are chamfered at the same angle relative to the engagement axis, one of them being flared and the other of them tapering, the chamfered faces mutually constituting sliding surfaces for causing said deformation during engagement.

4. A device according to claim 3, wherein the inlet face of the first fastening tapers on the outside to constitute a sliding face, the inlet face of the second fastening is flared on the inside to constitute another sliding face, the retaining element is constituted by a lip of triangular section situated on the outside periphery of the first fastener, said triangular section including a side constituted by the sliding face of the first fastener, the reception component being constituted by a triangular groove formed in the inside periphery of the second fastener.

5. A device according to claim 2, wherein the resilient means are disposed inside the second fastener and constitute a component sliding along the engagement axis and fitted with a spring which urges towards the inlet face of the second fastener, the sliding component including a thrust face and a pressure face, the first fastener also including a thrust face constituting a thrust surface which is common to the thrust face of the sliding component during assembly, the inlet face of the first fastener having an inside flare to form a common pressure surface with the pressure face of the sliding component which possesses a corresponding profile.

6. A device according to claim 5, wherein the return device for the resilient means is constituted by a rod fixed to the sliding component.

7. A device according to claim 2, wherein the tubular portion of the first fastener is axially split from the corresponding inlet face to constitute tongues each possessing a retaining component.

* * * * *